Feb. 20, 1973 J. C. HOHNE, JR., ET AL 3,717,780
DUAL MOTOR FOR CASSETTE DRIVE
Filed May 5, 1971
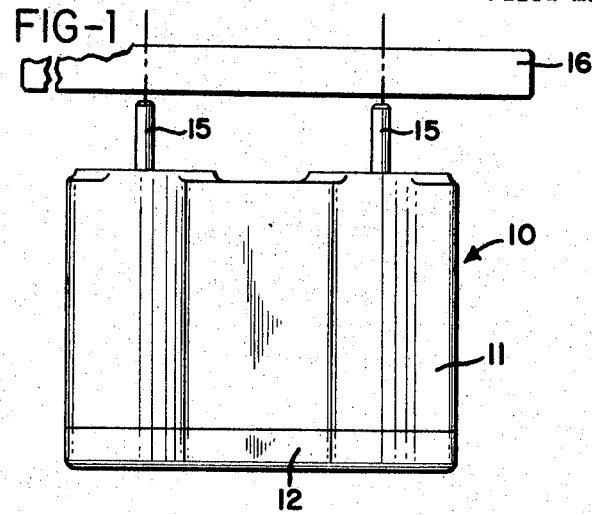
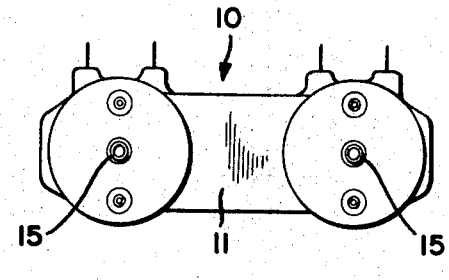
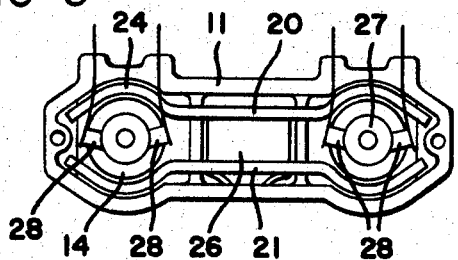
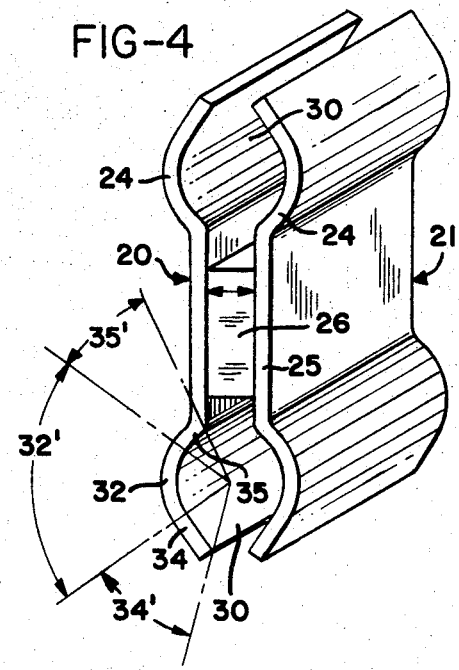
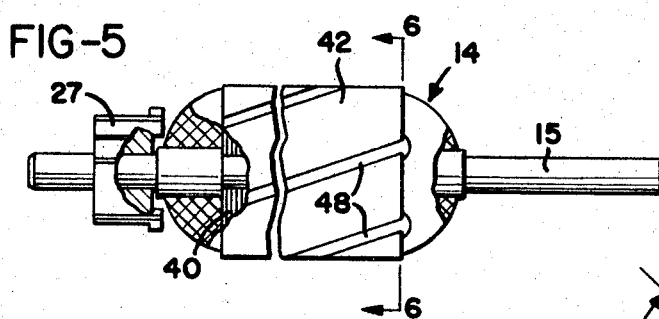
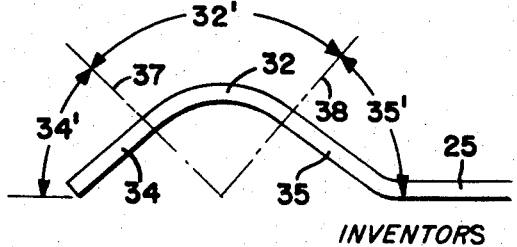
INVENTORS
JOHN C. HOHNE, JR. &
CARL J. JOHNSON
BY
Marechal, Biebel, French & Bugg
ATTORNEYS

United States Patent Office 3,717,780
Patented Feb. 20, 1973

3,717,780
DUAL MOTOR FOR CASSETTE DRIVE
John C. Hohne, Jr., Tipp City, and Carl J. Johnson, Dayton, Ohio, assignors to TRW Inc., Cleveland, Ohio
Filed May 5, 1971, Ser. No. 140,416
Int. Cl. H02k 7/20
U.S. Cl. 310—112                                        4 Claims

ABSTRACT OF THE DISCLOSURE

A dual armature motor particularly adapted for the direct drive of tape cassettes has a permanent magnet and a pair of armature plates which define a tapered air gap at the pole, and in which the armature is formed with winding slots which are skewed at an angle to the rotor axis to eliminate cogging when the motor armatures are driven at low speed.

BACKGROUND OF THE INVENTION

It is frequently desirable to drive magnetic tape wind and unwind apparatus at variable speeds, such as in computer operations and the like. Direct current motors are commonly used for this purpose with either permanent field magnets or wound magnets, and wound armatures.

In operations where precise speed control and where an absence of speed flutter or ripple torque is required, it has commonly been necessary to provide flywheels and/or weighted capstan drives to smooth out the ripple or cogging effect which is characteristic of such motors.

There is further a requirement for motors which will directly drive each of the reels in a two-reel cartridge or cassette, a typical example being known as the Phillips-type cassette cartridge. Such drives, particularly for computer applications, must be capable of operation through a wide range of speeds, such as 60 r.p.m. or lower on the one hand to 3600 r.p.m. or above on the other hand. While the effect of cogging, caused by the abrupt change in magnetic field in relation to the armature poles, as the armature rotates, it not critical at high r.p.m., it may become intolerable at low r.p.m. For this reason, it has not been practical to provide a direct drive of the cassette reels without the use of a capstan, due to the introduction of flutter in the tape by reason of the cogging effect. Even where a capstan is used, the alternate speed fluctuations in the takeup reel, for example, cause corresponding stretchings of the tape which are reflected into the nip between the capstan rollers, to introduce a flutter signal.

Attempts have been made in the past to develop direct current motors which have reduced cogging effect. The problem is discussed, for example, in Burr, 3,356,877 of 1967. Armatures having skewed slots are incidentally shown in Goss et al. 2,193,406 of 1940 and Wylie, 2,513,226 of 1950. A variable air gap at the pole pieces is shown in Keith 228,763 of 1880. Providing a direct current motor with an armature having skewed slots does have the effect of reducing the ripple torque. However, this technique alone is not enough. For one reason, there is a practical limit of the extent to which the slots can be skewed. Further, merely varying the air gap has some effect but it, also, is not sufficient by itself. Dual armature motors with no provision for reducing ripple torque are shown in Ketcher 532,789 of 1895 and in Latta et al. 3,471,729 of 1969.

SUMMARY OF THE INVENTION

The present invention is directed to the art of direct current motors and more particularly to a permanent magnet motor in which the air gap defined between the field pole pieces and the armature is varied or tapered, and in which the armature lamination stack is skewed to provide correspondingly skewed winding slots. It has been found that a particularly beneficial result is obtained by providing a motor in which the armature stack is skewed and the air gap is varied. A motor can be made having very low ripple torque effect, much lower than that which can be achieved by either technique alone. Also, it has been found that there is a desired correlation between the skewed angle and the arcuate extent of the pole.

An object of the invention is the provision of a dual armature motor in which two armatures are contained within a common housing and field structure for the direct drive of the reels of a tape cassette. In the preferred embodiment, the distance between the shaft centers is 1.673" corresponding to the standardized reel-to-reel center distance of the Phillips cassette, although other reel-to-reel distances may be used. It is therefore, an additional object to provide a drive motor which provides accurate parallel shaft-to-shaft positions as defined by a single housing for critical applications such as for the direct drive of a tape cartridge.

The direct current permanent magnet motor thus constructed is particularly adapted for use with speed control systems of the type shown in Hohne, 3,281,635 of 1966, with separate inputs applied to each section of the motor. At any one time, one section of the dual armature motor will be used for winding and the other section may be used, as desired, as a dynamic brake to produce a tension in the tape.

Another object of the invention is the provision of a direct current motor which has a minimum of ripple torque and which is particularly adapted for operation over a wide range of speeds, particularly into the low r.p.m. range, such as 60 r.p.m. or less.

Another important object of the invention is the provision, in a direct current motor, of a variable air gap combined with a rotor having skewed winding slots.

A still further object is the provision of a dual armature motor adapted for the direct drive of tape cassettes.

These and other objects of the invention will be apparent from the following description, the accompanying drawings, and the appended claims.

BRIEF DESCRIPTION OF THE DRAWINGS

FIG. 1 is a plan view of the motor of this invention;
FIG. 2 is an end view thereof;
FIG. 3 is an end view looking into the motor housing with the end plate removed;
FIG. 4 shows the relationship of the pole pieces and the magnet;
FIG. 4A is an enlarged view of a portion of one of the pole pieces;
FIG. 5 is an enlarged elevation, partially in section, of one of the motor armatures; and
FIG. 6 is an end view of the armature stack looking along the lines 6—6 of FIG. 5.

DESCRIPTION OF PREFERRED EMBODIMENT

In FIGS. 1 and 2, a motor 10 is shown as having a molded outer housing 11 and an end plate 12. The housing 11 includes a pair of parallel, spaced-apart armatures 14 which have corresponding output shafts 15, as shown in FIG. 1. The shafts 15 are preferably spaced on centers which are 1.673" apart adapted for direct drive alignment with the corresponding centers of the reels of a cassette 16.

The housing 11 supports a pair of oppositely spaced and transversely extended plate-like pole pieces 20 and 21. The pole pieces are formed with opposite curved ends 24, to be described in further detail below, separated by opposite straight sections 25. The pole pieces may thus be formed of sheet magnetic material, and a permanent magnet 26 is received in the space between the sections 25.

The individual armatures 14 are rotatably supported at one end in the housing 10 and at the other end in the end plate 12. The armatures have the usual commutators 27 (FIG. 5) and brush assemblies 28. The brush assembly and commutator arrangement may be as shown in Crawshaw et al., 3,445,693 of 1969. In the preferred embodiment, the pole pieces 20 and 21 do not form a housing for the armatures or the motor, but are themselves received in the enclosing housing 11.

As previously indicated, the motor of this invention includes special provision by means of which "cogging" ripple or torque is reduced to a minimum. For this purpose, the curved ends 24 of the pole pieces 20 and 21 define armature openings 30 within which the armatures 14 are received. The pole pieces, at the openings 30, are defined by a circular section 32 indicated by the arm 32' and by opposite tangential substantially straight sections 34 and 35 indicated by the arcs 34' and 35'. The straight sections 34 and 35 thus form, with respect to the cylindrical configuration of the armature, an air gap which decreases, and then increases with respect to the surface of the armature. Further, the straight sections 34 and 35 lead off from the circular section 32 at right angles to radius lines 37 and 38 in FIG. 4A. Preferably, the lengths of the straight sections 34 and 35 are substantially equal, and the arcuate extents thereof as indicated at 34' and 35' combined to equal or exceed the arcuate extent of the circular section 32.

The low ripple torque achieved by the present motor is not solely the result of providing a variable air gap at the pole pieces. This alone is not effective to produce the desired result. In addition, the indiivdual laminations 40 making up the stack 42 of the armature 14 are skewed through an angle indicated at 45 in FIG. 6 so that the winding slots 48 are not parallel to the axis of the shaft 15 but are skewed by the same angle 45. Preferably, the skew angle of the slots 48 is in the range of 50% of the total included angle between adjacent slots, for minimum cogging effect. For example, with a five-slot armature stack 42 of FIG. 5, the individual slots are spaced 72° arcuately from each other, and a skew of 50% would produce a skew angle 45 of 36°. The example given may be useful for a stack which has a length of approximately four times its diameter. Where the stack is of a shorter length, such as approximately two times the diameter better results are obtained by increasing the skew angle up to a maximum of approximately 100% of the arcuate spacing of the slots.

The curved portion 32 of the pole pieces 20 and 21 define the pole openings, in degrees. The extent of pole openings should be adjusted to approximate that of the included angle between adjacent slots 48. In other words, this pole center area should be approximately equal, in degrees, to 360 divided by the number of slots in the armature. The tangential straight sections 34 and 35 define the variable air gap. They may have an arcuate extent of approximately one-half that of the pole opening or pole center section 32.

The arrangement is thus one in which, due to the skewed axis of the slots 48, one edge of a slot will be just entering the region of maximum flux density or the region defined by section 32 when the axially opposite edge is just entering beneath the pole pieces at the section 34. Similarly, the next adjacent skewed slot will have one edge just leaving the section 32. By combining the skewed axis with the variable air gap, a substantially uniform torque may be applied to the armature 14 throughout its rotation, thus permitting relatively low speed operation with a minimum of variation in angular velocity.

While the form of apparatus herein described constitutes a preferred embodiment of the invention, it is to be understood that the invention is not limited to this precise form of apparatus, and that changes may be made therein without departing from the scope of the invention.

What is claimed is:

1. A dual armature DC motor specifically designed to direct drive the reels of a "Phillips" tape cassette at low speed with a minimum of speed variations, comprising a molded housing, a pair of oppositely-spaced and transversely-extending magnetic field pole pieces in said housing defining a pair of transversely-spaced armature openings, a pair of DC armatures rotatably mounted on said housing in said openings and being spaced apart a distance providing for direct connection with the respective reels of such cassette, each of said pole pieces at each said armature opening being defined by a circular section and a pair of opposite tangentially straight sections to form a tapered air gap with respect to each armature which decreases to a minimum radius and then increases with angular displacement of said armatures, each said armature being formed with winding slots which are skewed at an angle to the armature axis, and the circular sections of said pole pieces each defining an included arcuate angle which is at least equal to the skew angle of said armature slots so that one slot comes under the influence of flux at one said pole piece before a preceding slot leaves the influence of said flux.

2. The motor of claim 1 in which the skew angle of said slots is at least one-half the arcuate angle defined by said circular sections.

3. The motor of claim 1 in which said armatures are mounted on 1.673-inch center-to-center distance.

4. The motor of claim 1 further comprising a permanent magnet positioned between said pole pieces transversely between said armature openings.

References Cited
UNITED STATES PATENTS

| | | | |
|---|---|---|---|
| Re. 27,130 | 6/1971 | Murata | 179—100.2 |
| 3,471,729 | 10/1969 | Latta | 310—144 |
| 3,609,430 | 9/1971 | Buffington | 310—265 |
| 3,500,092 | 3/1970 | Heilmann | 310—51 |
| 3,510,707 | 5/1970 | Stone | 310—114 |
| 3,463,954 | 8/1969 | Latta | 310—114 |
| 3,609,431 | 9/1971 | Lifschitz | 310—266 |
| 3,651,355 | 3/1972 | Mason | 310—114 |

ROBERT SKUDY, Primary Examiner